United States Patent [19]
Slade et al.

[11] Patent Number: 5,936,814
[45] Date of Patent: Aug. 10, 1999

[54] MAGNETIC RECORDING HEAD USING A LAST INSULATOR TO OBTAIN AN ADJUSTABLE TAKE OFF ANGLE

[75] Inventors: Steven B. Slade, New Hope; Kenneth P. Ash, Chanhassen; Huy X. Pham, Arden Hills; Patrick C. Darst, Cottage Grove, all of Minn.

[73] Assignee: Seagate Technology, Inc., Scotts Valley, Calif.

[21] Appl. No.: 08/865,473

[22] Filed: May 29, 1997

Related U.S. Application Data

[60] Provisional application No. 60/019,005, Jun. 3, 1996.

[51] Int. Cl.$^6$ .............................. G11B 5/147; G11B 5/127
[52] U.S. Cl. ......................................... 360/126; 29/603.07
[58] Field of Search .................................... 360/125, 126; 29/603.01, 603.07, 603.13, 603.24

[56] References Cited

U.S. PATENT DOCUMENTS

| | | | |
|---|---|---|---|
| 4,782,414 | 11/1988 | Krounbi et al. | 360/113 |
| 4,803,580 | 2/1989 | Mowry | 360/113 |
| 4,816,947 | 3/1989 | Vinal et al. | 360/113 |
| 4,891,725 | 1/1990 | Mowry | 360/113 |
| 4,940,511 | 7/1990 | Fontana, Jr. et al. | 156/656 |
| 5,130,877 | 7/1992 | Hsie et al. | 360/126 |
| 5,155,643 | 10/1992 | Jones, Jr. et al. | 360/113 |
| 5,155,646 | 10/1992 | Fujisawa et al. | 360/126 |
| 5,168,409 | 12/1992 | Koyama et al. | 360/113 |
| 5,227,212 | 7/1993 | Ahlert et al. | 360/97.01 |
| 5,256,249 | 10/1993 | Hsie et al. | 156/656 |
| 5,274,520 | 12/1993 | Matsuzono et al. | 360/113 |
| 5,621,596 | 4/1997 | Santini | 360/126 |

*Primary Examiner*—George J. Letscher
*Attorney, Agent, or Firm*—Kinney & Lange, P.A.

[57] ABSTRACT

A writer portion of a recording head is disclosed. The writer portion includes a lower magnetic pole. An oxide gap is positioned on the lower magnetic pole. A first insulating layer is positioned on a first portion of the gap oxide, the first insulator layer having a planarized top surface. A plurality of intermediate insulating layers are positioned on top of the first insulating layer. Each intermediate insulating layer encapsulates a layer of conductive coils and has a planarized top surface. A last insulating layer is positioned on top of a portion of the plurality of intermediate insulating layers and on top of a second portion of the gap oxide. An upper magnetic pole is positioned on top of the last insulating layer and on top of a third portion of the gap oxide.

7 Claims, 3 Drawing Sheets

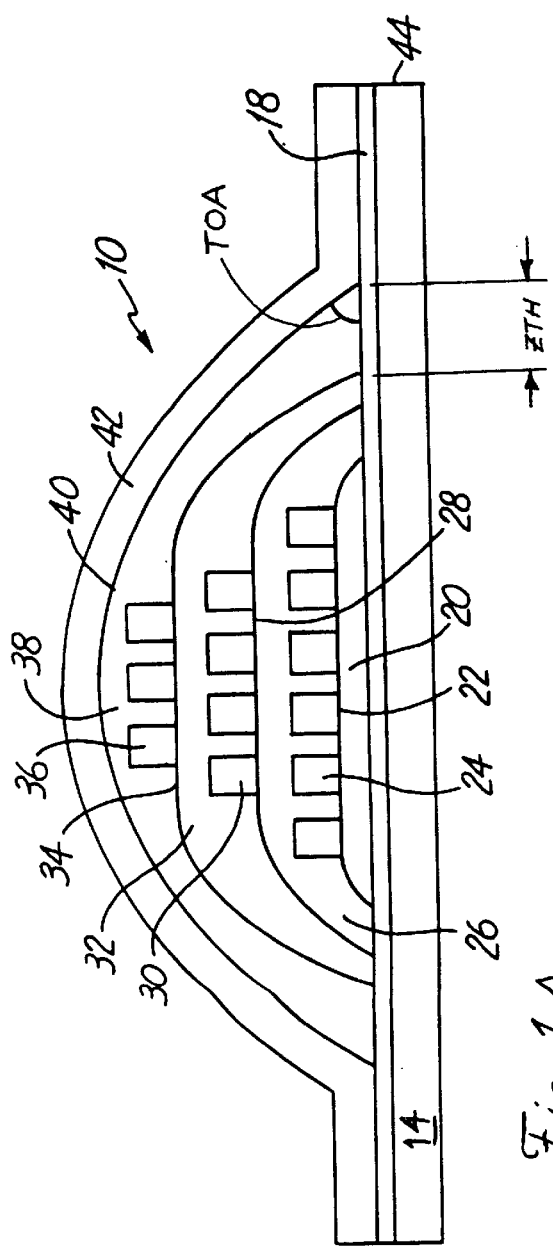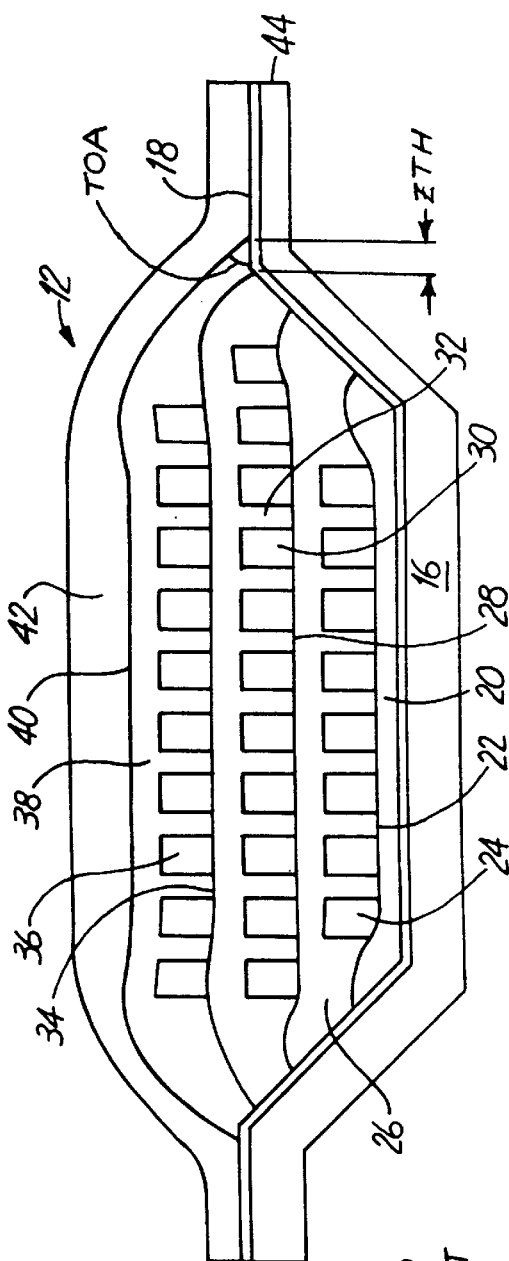

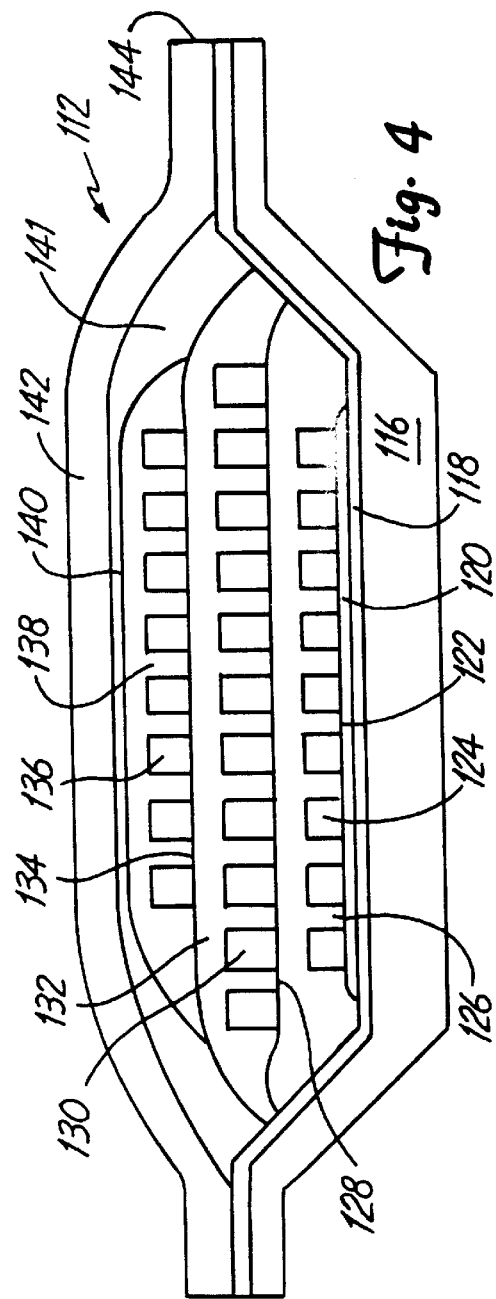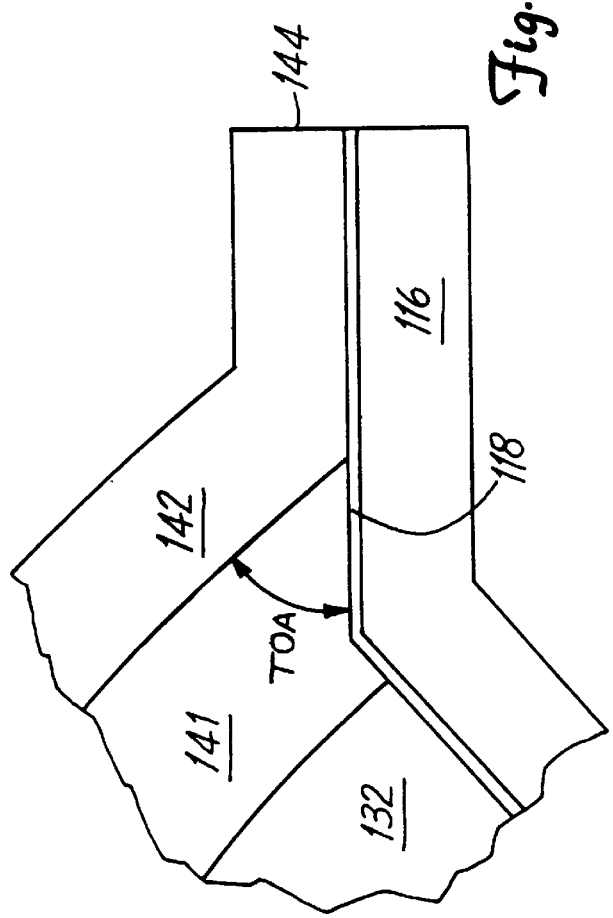

MAGNETIC RECORDING HEAD USING A LAST INSULATOR TO OBTAIN AN ADJUSTABLE TAKE OFF ANGLE

This application claims the priority benefit of a provisional U.S. patent application having application Serial No. 60/019,005, filed on Jun. 3, 1996.

BACKGROUND OF THE INVENTION

The present invention is a magnetic recording head for recording information to a storage medium. In particular, the present invention is a magnetic recording head which employs a last insulator layer for the purpose of providing a proper take-off angle.

Presently there are two types of recording heads used in a computer device. First, there is an inductive magnetic recording head which incorporates an inductive writer portion and an inductive reader portion. Second, there is a magnetoresistive recording head which incorporates an inductive writer portion and a magnetoresistive reader portion. Thus, regardless of the type of reader portion which is utilized in the recording head, the writer portion is an inductive writer portion.

A typical inductive writer of a recording head consist of one or more coil conductor layers protected by insulating layers and surrounded by upper and lower magnetic cores (also called top and bottom poles) which are separated at the air bearing surface by a thin magnetic gap layer. Fabrication of the coil layers typically involves planarizing the surface on which the coils will be positioned with either a photoresist process or a metallic layer and photoresist combination process. Individual coils are then positioned on the planarized surface and encapsulated with another photoresist layer to insulate and electrically isolate the coil as well as protect the coils from damage during subsequent processing steps.

As coils are typically stack several layers high, most insulating photoresist layers provide insulation and isolation of a coil layer and provide a planarized top surface upon which a succeeding coil layer in the stack can be fabricated. Coil layers will typically form stepped surfaces in which the next coil layer is either larger than the previous coil layer, when coil layers are formed upon a recess bottom pole, or is smaller than the preceding layer, when coil layers are formed on a planarized bottom pole or extend above the recess portion of the bottom pole.

There are two critical dimensions of an inductive writer portion of a recording head which are determined by the location, placement and topography of the coil insulating layers. These dimensions are the takeoff angle (TOA) and the zero throat position. The TOA is defined as the angle between the upper and lower magnetic cores at the point where the magnetic cores separate from one another to surround coil layers and photoresist layers. The zero throat position is defined as the distance between either the separation point of the upper and lower magnetic cores and the point at which a recess begins for a recessed bottom pole, or between the separation point of the upper and lower magnetic cores and the location of the second to last insulating layer for a planarized bottom pole.

In a typical inductive writer, the TOA and zero throat position are determined by the position and thickness of the photoresist layer used to insulate and electrically isolate the last coil layer. Thus, the photoresist which determines the zero throat position and the TOA is also used to protect and insulate a coil layer, i.e. the last fabricated coil layer. This use restricts the thickness of the photoresist to a narrow range as well as restricts the range of available zero throat positions.

The efficiency of an inductive writer is determined in part by the TOA, as this angle influences how much flux can leak from the upper magnetic core to the lower magnetic core without crossing the gap oxide layer at the air bearing surface. Head efficiency and performance is also influenced by the throat height, which is the distance between the air bearing surface and the zero throat position. The throat height is determined by the zero throat position and by how far the head is lapped from the air bearing surface during fabrication. The zero throat position can also interact with the TOA in that the TOA is increased the closer the zero throat position is located towards the coil stack.

There is a need for a writer portion of a magnetic recording head and a method of making a writer portion of a magnetic recording head which accurately controls the take off angle and the zero throat position of the writer. The TOA influences how much flux can leak from the upper magnetic core to the lower magnetic core without crossing the gap oxide layer as well as pinches or limits the amount of transferable flux during a writing process. In addition, control of the take off angle is crucial for subsequent wafer process use, most notably the forming of the pole pieces for track width control. In addition, depending on the type of material used for the top pole, the physical properties of the top pole can be influenced by the take off angle.

SUMMARY OF THE INVENTION

The present invention is a writer portion of a recording head which provides significant control of a take-off angle and a zero throat position of the writer. In a preferred embodiment, the writer includes a lower magnetic core or bottom pole. A gap oxide is positioned on the bottom pole. A first insulating layer is positioned on a first portion of the gap oxide, the first insulator layer having a planarized top surface. A plurality of intermediate insulating layers are positioned on top of the first insulating layer. Each intermediate insulating layer encapsulates a layer of conductive coils. Each intermediate layer also has a planarized top surface. Thus, each layer of conductive coils is positioned on a planarized surface. A last insulating layer is positioned on top of a portion of the plurality of intermediate insulating layers and on top of a second portion of the gap oxide. An upper magnetic core or pole is positioned on top of the last insulating layer and on top of a third portion of the gap oxide.

By utilizing a separate last insulating layer which does not insulate a layer of conductive coils, the last insulating layer can be formed having a wide range of thicknesses and viscosities, which in turn provides for adjustment of the take off angle of the writer to a desired angle. In addition, the last insulating layer can also smooth the topography of the preceding insulator layers.

BRIEF DESCRIPTION OF THE DRAWINGS

FIG. 1A is a prior art inductive writer having a planar bottom pole.

FIG. 1B is a prior art inductive writer having a recessed region of a bottom pole.

FIG. 4 is an inductive writer having a recessed region of a bottom pole incorporating the present invention.

FIG. 5 is an enlarged section of the inductive writer shown in FIG. 4 incorporating the present invention.

DETAILED DESCRIPTION OF THE PREFERRED EMBODIMENTS

Figure 2:
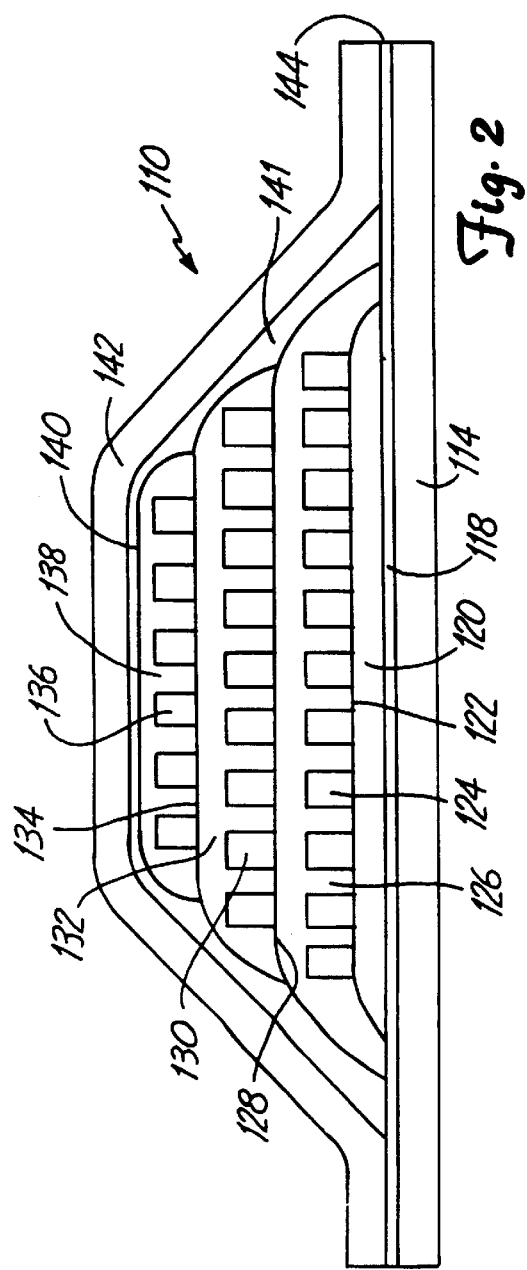
FIG. 2 is an inductive writer having a planar bottom pole incorporating the present invention.

FIGS. 1A and 1B each show a typical inductive writer portion of a magnetic recording head. Inductive writer 10 is substantially similar to inductive writer 12, except that inductive writer 10 is formed having a planar bottom pole 14, while inductive writer 12 is formed having a recessed bottom pole 16. Thus, similar features of inductive writers 10 and 12 have been labeled identical.

As shown in FIGS. 1A and 1B, inductive writers 10 and 12 each have bottom poles 14 and 16, respectively, gap oxide 18, insulating layer 20 having top surface 22, coil conductor layer 24, insulating layer 26 having top surface 28, coil conductor layer 30, insulating layer 32 having top surface 34, coil conductor layer 36, insulating layer 38 having top surface 40, top pole 42 and air bearing surface 44.

As shown in each of FIGS. 1A and 1B, inductive writers 10 and 12 each have three layers of conductive coils 24, 30 and 36. However, it is understood by those in the art that the number of layers of conductive coils can vary depending upon the particular application. For example, inductive writers are often fabricated having from one to four coil layers. Fabrication of coil conductor layers 24, 30 and 36 typically involve planarizing the surface upon which the coils will lay with either a photoresist or a metallic layer and photoresist combination. Inductive coils are then plated on the planarized surface, after which they are encapsulated with another photoresist layer to insulate and electrically isolate the coils as well as protect the coils from damage during subsequent processing steps. As coils can be stacked three or four layers high, the insulating photoresist layer typically has a planarized top surface for the formation of the succeeding coil layer. Coil layers will typically form stepped surfaces in which the next coil layer is larger than the prior coil layer (when layers are formed upon a recessed bottom pole, such as shown in FIG. 1B) or are smaller than the preceding layer (as in the case when coil layers are formed on a planar bottom pole as shown in FIG. 1A, or extend above the recessed portion of a recessed bottom pole as shown in FIG. 1B).

There are two critical dimensions of a recording head which are determined by the location, placement and topography of coil insulating layers 26, 32 and 38. These dimensions are the take-off angle (TOA) and the zero throat (ZTH) position. FIGS. 1A and 1B show how these dimensions are defined for both recessed and planar type transducers.

Head efficiency is determined in part by the TOA. An optimal TOA is in the range of 40°–50°. In the case of a small TOA, such as in the range of 20°–30°, this angle influences how much magnetic flux can leak from top pole 42 to bottom or shared pole 14 and 16 without crossing gap oxide 18 at air bearing surface 44. This leakage is not desired. In addition, in the case of a large TOA, such as in the range of 60°–70°, top pole 42 tends to form in such a way that it pinches or limits the amount or transferable flux during a writing process or introduces track width control problems. Depending on the application, these limitation may be desired.

Head performance is also influenced by the throat height, which is the distance from the zero throat position to the air bearing surface. The throat height is determined by the zero throat position and how far the head is lapped from air bearing surface 44 during the fabrication process. A zero throat position interacts with the TOA in that the TOA is increased the closer the zero throat position is located to coil layers 24, 30 and 36. In a typical recording head, the TOA and zero throat dimensions are determined by the position, thickness and viscosity of the photoresist used to protect and insulate the last coil layer (coil layer 36 shown in FIGS. 1A and 1B). The thickness and viscosity of the photoresist restricts the TOA to a narrow range as well as restricts the range of available zero throat positions. In the case of prior art inductive writers 10 and 12, the TOA must be large (60°–70°) due to the fact that coil insulating layer 38 must be thick enough to cover coils 36. This thickness inhibits having a desired TOA in the range of 40°–50°, and preferably between 43°–47°.

The present invention will now be described with reference to FIGS. 2–5. The present invention provides a means of controlling the TOA by employing a separate last insulator layer which does not insulate a coil layer. Rather, the last insulator layer is used solely to set the zero throat position and TOA. Because a separate insulating layer is used to protect the final coil layer, the last insulator does not have to provide insulating coverage over a coil layer. This insulator can therefore have a wide range of thicknesses and viscosity, which in connection with the zero throat position, can provide for adjustment of the TOA in the range of approximately 20° to 70°, and preferably in the range of 40° to 50°. In addition, the zero throat position can easily be varied from 1 to 10 micrometers. An added benefit of having the last insulating layer providing no protection for a coil layer is that the last insulating layer can also smooth the topography of the preceding insulating layers. However, it is not necessary that this separate last insulating layer smooths the preceding structure for control of the TOA. In fact, it is not necessary that this last insulating layer provides coverage of preceding insulating layers.

Figure 3:
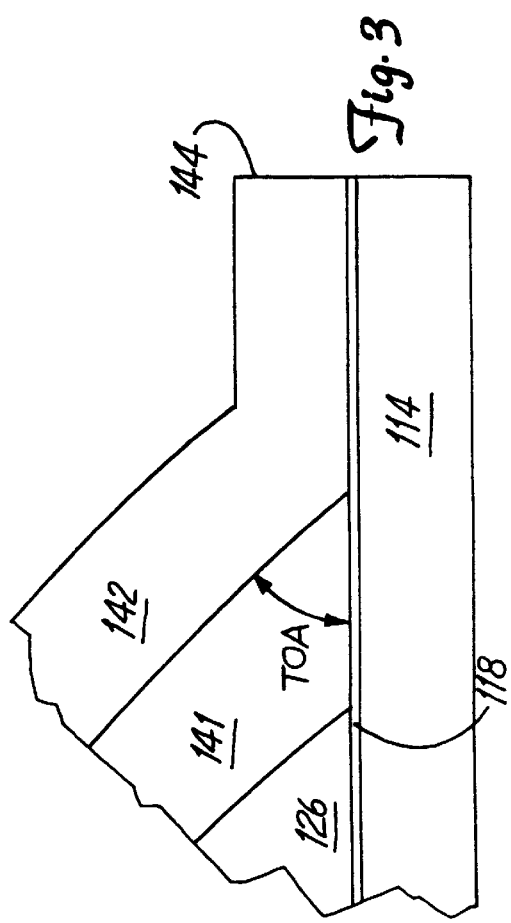
FIG. 3 is an enlarged section of the inductive writer shown in FIG. 2 incorporating the present invention.

FIG. 2 is an inductive writer having a planar bottom pole incorporating the present invention, while FIG. 3 is an enlarged section of the inductive writer shown in FIG. 2. Likewise, FIG. 4 is an inductive writer having a recessed bottom pole incorporating the present invention, while FIG. 5 is an enlarged section of the inductive writer shown in FIG. 4.

Inductive writer 110 shown in FIGS. 2 and 3 is substantially similar to inductive writer 112 shown in FIGS. 4 and 5. Thus, like features have been numbered as such. Inductive writer 110 includes planar bottom pole 114, while inductive writer 112 includes recessed bottom pole 116. Inductive writers 110 and 112 each include gap oxide 118, insulating layer 120 having top surface 122, coil conductive layer 124, insulating layer 126 having top surface 128, coil conductive layer 130, insulating layer 132 having top surface 134, coil conductive layer 136, insulating layer 138 having top surface 140, last insulating layer 141, top pole 142 and air bearing surface 144.

As shown in FIGS. 2 and 4, gap oxide 118 is fabricated on bottom poles 114 and 116, respectively. Insulating layer 120 is formed on a first portion of gap oxide 118. Insulating layers 126, 132 and 138 are formed on a second portion of gap oxide 118. Finally, top pole 142 is formed on a third portion of gap oxide 118 and on a portion of insulating layers 126, 132 and 138.

Fabrication of coil layers 124, 130 and 136 typically involve planarizing the top surface upon which the coils will lay with either a photoresist or a metallic layer and photoresist combination. Inductive coils are then plated on the planarized surface, after which they are encapsulated with another photoresist layer to insulate and electrically isolate the coils as well as protect the coils from damage during subsequent processing steps. The insulating photoresist layers typically have a planarized top surface which aids in the formation of the succeeding coil layer. As previously discussed with reference to FIGS. 1A and 1B, a coil layer will typically be smaller than the preceding layer (as in the case when coil layers are formed on a planarized bottom pole as shown in FIG. 2) or will typically form stepped surfaces in which the next coil layer is larger than the prior coil layer (when layers are formed upon a recessed bottom pole, as shown in FIG. 4).

As shown in FIGS. 2–5, the TOA of inductive writer 110 or 112 can easily be adjusted to obtain a desired TOA for a particular application. Obtaining a desired TOA is done by varying the thickness and viscosity of last insulating layer 141. With respect to the viscosity of last insulating layer 141, the lower the viscosity, the thinner the photoresist is and the easier it flows. Thus, with a low viscosity photoresist, the photoresist will flow down and around the previously laid coil insulating layers. This will provide a small TOA. Conversely, with a high viscosity photoresist, the photoresist will not flow as freely, and will provide a large TOA.

While the present invention will provide for a TOA which can vary in the range from 20°–70°, it must be understood that there is a lower limit for an acceptable TOA. If the TOA of an inductive writer becomes too small, such as in the range of 20°–30°, there is a possibility of flux leakage between top pole 142 and bottom pole 116. Thus, the amount of flux which reaches air bearing surface 144 is inhibited, which can result in an inadequate transfer of data. Conversely, if the TOA becomes to large, such as in the range of 60°–70°, magnetic flux will be pinched due to an incorrectly fabricated top pole or control of the top pole width will be compromised.

As shown in FIGS. 2–5, the present invention provides for an inductive writer which has the capability of varying the TOA of the inductive writer. Variance of the TOA is critical in order to provide an inductive writer which will properly transfer information to a magnetic storage medium. Obtaining a desired TOA in the range of 40°–50°, and preferably in the range of 43°–47°, will both prevent leakage of magnetic flux between the top pole and the bottom pole of the inductive reader, and will prevent magnetic flux from being pinched due to a top pole being formed having a high TOA and provide for the best control of the magnetic track width.

In addition to the above discussed reasons for manipulating the TOA, control of the TOA is crucial for subsequent wafer process use, most notably the forming of the pole pieces for track width control. In addition, depending on the type of material used for the top pole, the physical properties of the top pole can be influenced by the TOA.

Although the present invention has been described with reference to preferred embodiments, workers skilled in the art will recognize that changes may be made in form and detail without departing from the spirit and scope of the invention.

What is claimed is:

1. A method of fabricating a writer of a recording head, the method comprising:

fabricating a lower magnetic core;

fabricating a gap oxide on the lower magnetic core;

fabricating a first insulating layer on a first portion of the gap oxide;

fabricating a plurality of intermediate insulating layers on the first insulating layer;

fabricating a layer of conductive coils in each intermediate insulating layer;

fabricating a last insulating layer on a portion of the intermediate insulating layers and on a second portion of the gap oxide, wherein a desired take-off angle is solely defined by controlling a viscosity of the last insulating layer; and fabricating an upper magnetic core on the last insulating layer and on a third portion of the gap oxide.

2. The method of claim 1 and further comprising:

planarizing a top surface of the first insulating layer prior to the step of fabricating a layer of conductive coils.

3. The method of claim 2 and further comprising:

planarizing a top surface of each intermediate insulating layer of the plurality of intermediate insulating layers which contains a plurality of conductive coils.

4. A writer of a recording head having an air bearing surface, the writer comprising:

a lower magnetic core;

a gap oxide positioned on the lower magnetic core;

a first insulating layer positioned on a first portion of the gap oxide distal to the air bearing surface, the first insulator layer having a planarized top surface;

a plurality of intermediate insulating layers positioned on top of the first insulating layer, each intermediate insulating layer having a layer of conductive coils, wherein each intermediate insulating layer has a planarized top surface;

a last insulating layer positioned on top of a portion of the plurality of intermediate insulating layers and on top of a second portion of the gap oxide, wherein a desired take-off angle is defined solely controlling a viscosity of the last insulating layer; and an upper magnetic core positioned on top of the last insulating layer and on top of a third portion of the gap oxide proximal to the air bearing surface.

5. The writer of claim 4 and further comprising:

a zero throat height in the range of 1 $\mu$m to 10 $\mu$m.

6. The writer of claim 4 and further comprising:

a take-off angle in the range of 20° to 70°.

7. The writer of claim 4 and further comprising:

a take-off angle in the range of 40° to 50°.

* * * * *